Dec. 19, 1939.  A. GRAMPP  2,184,097
SEESAW OPERATED VEHICLE
Filed Sept. 24, 1937  2 Sheets-Sheet 1
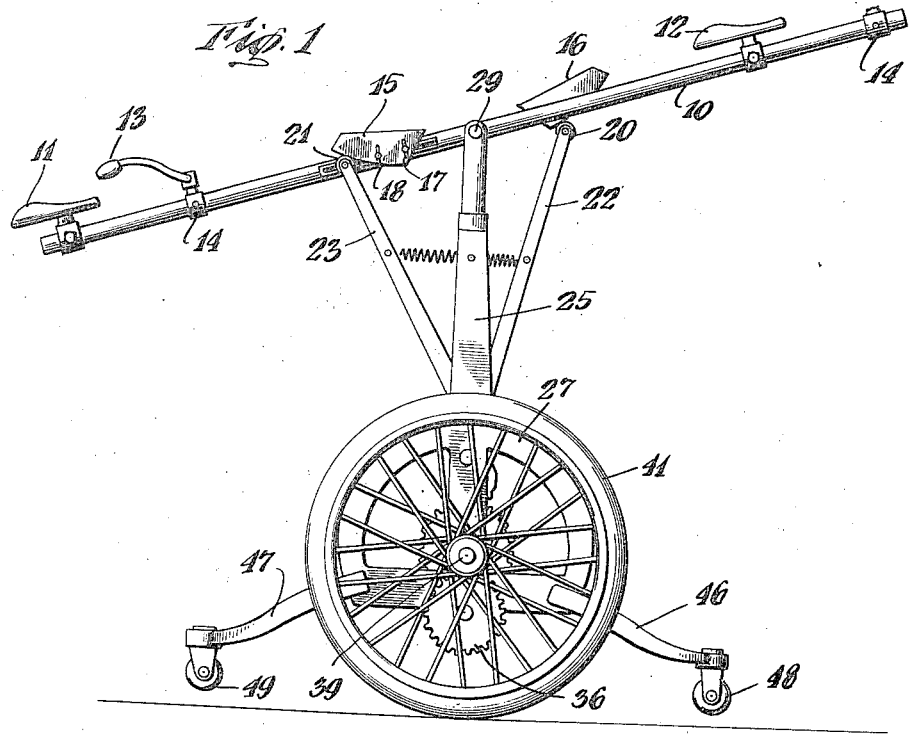
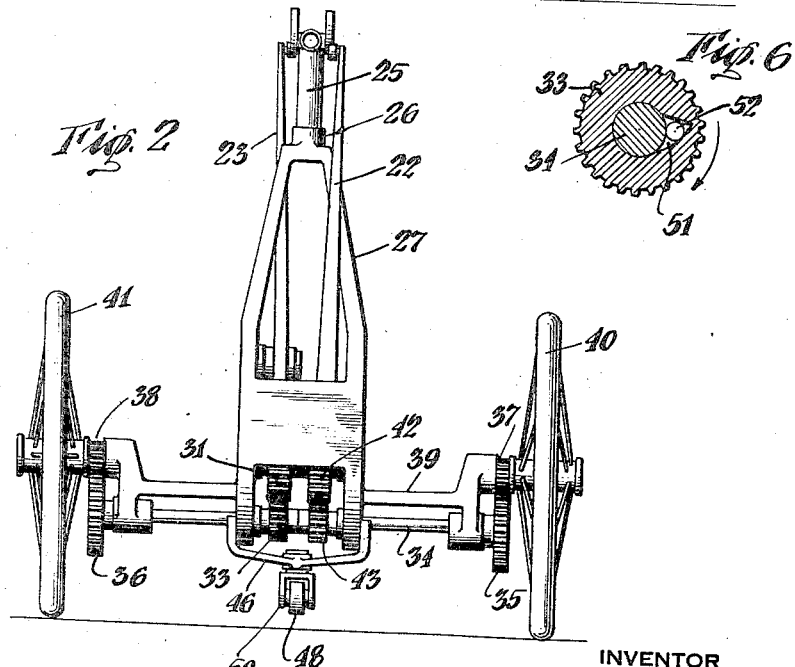
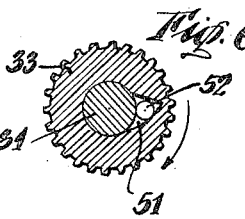
INVENTOR
Albert Grampp
BY
George C. Heinicke
ATTORNEY

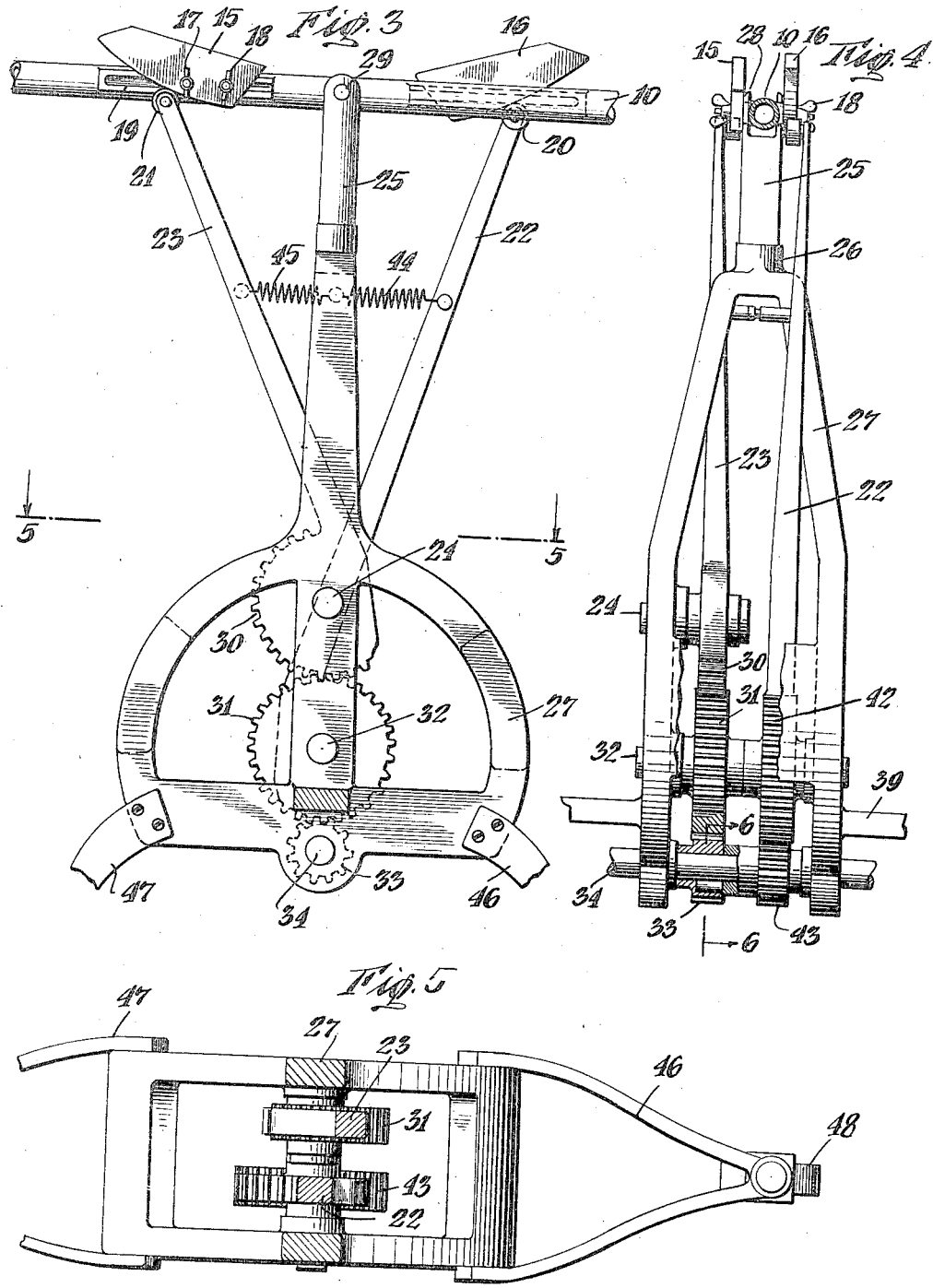

Patented Dec. 19, 1939

2,184,097

UNITED STATES PATENT OFFICE 2,184,097

SEESAW OPERATED VEHICLE

Albert Grampp, New York, N. Y.

Application September 24, 1937, Serial No. 165,474

3 Claims. (Cl. 280—222)

This invention relates to improvements in vehicles, particularly vehicles using a seesaw operated mechanism for the propulsion of the vehicle, well adapted for use by old and young or as a toy.

It is the principal object of my invention to provide a traveling seesaw device from which a maximum of pleasure and amusement will be derived by the operators and which will be convenient and easy to operate.

Another object of my invention is the provision of a vehicle of this type which is of a comparatively simple design, economical to manufacture, and not liable to easily get out of order, as it is durable and highly efficient in its operation as a free-wheeling vehicle.

Still another object of my invention is the provision of a seesaw operated vehicle including a novel and improved power transmitting mechanism operated by cam and spring controlled levers for operating the gears imparting to the vehicle its traveling motion.

A further object of my invention is the provision of a vehicle equipped with means to transfer the up and down motion of the seesaw into a linear forward movement regardless which of the operators is up or down.

A still further object of my invention is the provision of a seesaw propelled vehicle equipped with means to support the vehicle when at rest.

These and other objects and advantages of my invention will become more fully known as the description thereof proceeds, and will then be specifically defined in the appended claims.

In the accompanying drawings forming a material part of this disclosure:

Fig. 1 is a side elevation of a vehicle constructed according to my invention.

Fig. 2 is a front end view thereof.

Fig. 3 is a fragmentary side elevation of the actuating means on a somewhat enlarged scale.

Fig. 4 is a fragmentary rear end view of the vehicle, partly in section, and parts being broken away for the sake of clearer illustration.

Fig. 5 is a top plan view in section on line 5—5 of Figure 3, and seen along this line.

Fig. 6 is a detail view of a ratchet gear in section on line 6—6 of Figure 4.

As illustrated, the seesaw operating bar or rod 10 carries the two saddles 11, 12 adjustable on said bar for the seating of two persons operating the vehicle facing towards the front. In front of each of the saddles handle bars 13 are provided in their respective adjustable sockets 14.

Two cams 15, 16 are adjustably provided on opposite sides of the rod 10, and their adjustment and locking to the bar is effected by means of bolts carrying wing nuts 17, 18 and displaceable in longitudinal slots 19 of the rod 10.

These cams 15, 16 engage rollers 20, 21 at the ends of the operating levers 22, 23, and the lever 22 is pivoted near its lower end upon shaft 32, while the lever 23 is pivoted near its lower end upon shaft 24 on a center upright or post 25, adjustable in height in a socket 26 of a frame 27, while the upper end of the post 25 is forked, as at 28, for the pivotal attachment of bar 10, as at 29.

The lever 23 has at its lower end a gear segment 30 formed integral therewith and meshing with a gear 31 journalled on a shaft 32 which is journaled in frame 27, and gear 31 in turn meshes with a smaller gear 33 connected by the intermediary of a roller clutch 52 to the shaft 34 also journaled in frame 27 and carrying at its outer ends gears 35, 36 in mesh with the gears 37, 38 on axle 39 rigidly connected with the wheels 40 and 41 of the vehicle.

The lever 22 has its lower end formed into a gear segment 42 and gear segment 42 is integral with lever 22 and is in mesh with a gear 43 also connected by the intermediary of a roller clutch 52 to the shaft 34, while springs 44, 45 are attached at their ends to pins on levers 22 and 23 intermediate their ends and to a pin on the upright 25 to limit the outward movements of the levers and to return the same into their original positions after each operation.

To the side faces of the lower widened end of the frame 27 are attached the pairwise arranged arms 46, 47 the outer ends of which, approaching one another, carry casters 48, 49 in their cages 50 to keep the vehicle balanced when at rest.

In Figure 6, I have shown a roller clutch 52. The gear 33 on its shaft 34 has a substantially wedge-shaped chamber 51 formed therein in which is located a ball 52 to compel the shaft to turn in the direction imparted to the same by gear 43.

In use, the operators of the vehicle mount the saddles facing in the direction of driving. They then impart to the beam 10 the usual up and down seesaw movements. These movements are transferred to the levers 22 and 23 by means of the cams and rollers, and the segment 30 on shaft 24 will be operated by lever 23 to turn the gear 31 in mesh therewith.

Simultaneously the operation of lever 22 will turn gear segment 42 in the opposite direction. Gear 31 meshes with gear 33 on the driving shaft 34, and gear segment 42 on lever 22 meshes with gear 43 also on the shaft 34. Gears 33 and 43 are connected to the shaft 34 by a roller clutch 52 (Fig. 6) in such a manner as to allow the rotation of shaft 34 in one direction only, i. e., in the direction of driving, while a rotation in the opposite direction will be prevented by the wedging of roller 52 against the wall of chamber 51.

It will be understood, that I have described and shown the preferred form of my invention only as one example of the many possible ways to practically construct the same, and that I may make such changes in its general arrangement and in the construction of the minor details thereof, as come within the scope of the appended claims without departure from the spirit of my invention, and the principles involved.

Having thus described my invention, what I claim as new, and desire to secure by Letters Patent is:

1. In a seesaw operated vehicle, a longitudinally slotted seesaw operating rod or bar, a support therefor to which said rod is pivoted at its center, a pair of cams, one on each side of said rod, means engaging in the slots of said rod to adjust said cams, operating rods pivoted intermediate their ends to the vehicle frame, and carrying rollers to be engaged by said cams to actuate said levers upon the operation of said rod, a system of gears, means on said levers to operate said system of gears upon the operation of said levers, and means to transfer the operation of said gear system to the vehicle wheels.

2. In a seesaw operated vehicle of the class described, a frame, an adjustable upright mounted in a socket of said frame, and having a forked upper end, a seesaw operating rod pivoted between the prongs of said forked upper end, a pair of operating levers pivoted intermediate their ends in said frame, means to operate said levers from said rod, a pair of springs between said upright and said levers to limit the movements of said levers and return the same into their original position after each operation, a system of gears adapted to be operated by said levers, a shaft rotated by the operation of said gear system, and a means to transfer the rotation of said shaft to the vehicle axle and its wheels.

3. In a seesaw propelled vehicle as described, a pair of operating levers actuated by the operation of the seesaw, and pivoted intermediate their ends to the frame of the vehicle, toothed segments formed at the lower ends of said levers, a system of gears operated by said toothed segments upon the operation of said levers by the seesaw operation, a shaft rotated by said system of gears, and a means to transmit the rotation of said shaft to the vehicle wheels, and means to ensure the rotation of said shaft in one direction during the alternating up and down movements of the seesaw.

ALBERT GRAMPP.